United States Patent [19]

Brown

[11] Patent Number: 5,277,081
[45] Date of Patent: Jan. 11, 1994

[54] FORCE REVERSING AND TRANSMITTING APPARATUS FOR A PARKING BRAKE SYSTEM

[75] Inventor: Robert K. Brown, Plymouth, Mich.

[73] Assignee: Ford Motor Company, Dearborn, Mich.

[21] Appl. No.: 966,252

[22] Filed: Oct. 26, 1992

[51] Int. Cl.⁵ .......................... G05G 1/04; G05G 1/00
[52] U.S. Cl. .................... 74/523; 74/501.6; 74/528; 74/516; 74/491; 296/208
[58] Field of Search ............ 74/523, 491, 501.6, 74/535, 516, 528, 557; 192/4A; 296/208

[56] References Cited

U.S. PATENT DOCUMENTS

| | | | |
|---|---|---|---|
| 3,580,104 | 5/1971 | Yashiro | 74/535 |
| 3,727,481 | 4/1973 | Nicholson | 74/491 |
| 3,921,471 | 11/1975 | Smith | 74/523 |
| 4,075,907 | 2/1978 | Petrzelka | 74/523 |
| 4,212,211 | 7/1980 | Rickert | 74/538 |
| 4,428,613 | 1/1984 | Nomura | 74/533 |
| 4,440,269 | 4/1984 | Harriott | 74/523 X |
| 4,819,501 | 4/1989 | Kraus et al. | 74/528 X |
| 4,881,424 | 11/1989 | Clark et al. | 74/535 X |
| 5,065,643 | 11/1991 | Axtell | 74/501.6 |
| 5,159,850 | 11/1992 | Naoi et al. | 74/523 |

FOREIGN PATENT DOCUMENTS

| | | | |
|---|---|---|---|
| 2645982 | 4/1978 | Fed. Rep. of Germany | 74/523 |
| 2-53657 | 2/1990 | Japan | 74/523 |
| 68257 | 3/1990 | Japan | 74/523 |
| 2147088 | 5/1985 | United Kingdom | 74/523 |

Primary Examiner—Vinh I. Luong
Attorney, Agent, or Firm—Raymond L. Coppiellie; Roger L. May

[57] ABSTRACT

A parking brake apparatus for use in a motor vehicle, mounted on a floor member which operatively connects a hand-operated brake actuator to a wheel brake is disclosed. The parking brake apparatus comprises a link member for reversing and transmitting an input force from the brake actuator to an output force on a cable linkage. The apparatus allows a hand operated parking brake actuator to be used in a vehicle with a cable linkage routed into the front of the actuator rather than into the rear of the actuator.

12 Claims, 3 Drawing Sheets

FORCE REVERSING AND TRANSMITTING APPARATUS FOR A PARKING BRAKE SYSTEM

BACKGROUND OF THE INVENTION

1. Field of the Invention

This invention relates generally to a parking brake system for a motor vehicle. More specifically, the present invention relates to a force reversing and transmitting apparatus for use therein.

2. Disclosure Information

U.S. Pat. No. 4,212,211 discloses a conventional hand operated parking brake actuator. Typically, the actuator is mounted to a floor member within easy reach of the vehicle operator. The actuator transmits the operator's input force on the handle of the actuator to an output force at a cable attachment on the actuator, thus resulting in a tension force in a cable linkage. The cable linkage transmits the tension force to engage a set of rear wheel brakes. The cable linkage in a conventional parking brake actuator design runs directly rearward from the cable attachment at the actuator toward the wheel brakes.

In the design of an electrical vehicle, economical adaptation of a conventional parking brake actuator presents challenges previously not encountered. An electric vehicle carries a battery for a source of energy. The size, shape and mass of the monolithic battery requires a structurally unencroached mounting location within the vehicle structure. Typically, the most feasible location for the battery is under the cargo floor, immediately rearward of the operator seating area. This conflicts with use of a conventional hand operated parking brake actuator, since the conventional actuator requires routing the cable linkage directly to the rear of the brake actuator and therefore, the cable linkage would encroach the battery package space.

It would be desirable to provide an apparatus that would allow the use of a conventional parking brake actuator in battery powered electric vehicles.

SUMMARY OF THE INVENTION

According to the present invention, a parking brake apparatus is disclosed for use in a motor vehicle, the apparatus being mounted on a floor member of the vehicle, to operatively connect a hand-operated brake actuator to a wheel brake. The parking brake apparatus comprises link means for reversing and transmitting an output force from the brake actuator to a tension force at the wheel brake. The parking brake apparatus further comprises bracket means for mounting the brake actuator to the floor member and cable means operatively connecting the link means to the wheel brake.

One advantage the present invention provides is the use of a conventional parking brake actuator in a vehicle in which the cable means projects from the front of the actuator to engage the wheel brakes. These and other objects and advantages of the present invention will become apparent from the drawings, description and claims which follow.

DETAILED DESCRIPTION OF THE PREFERRED EMBODIMENT

Figure 1:
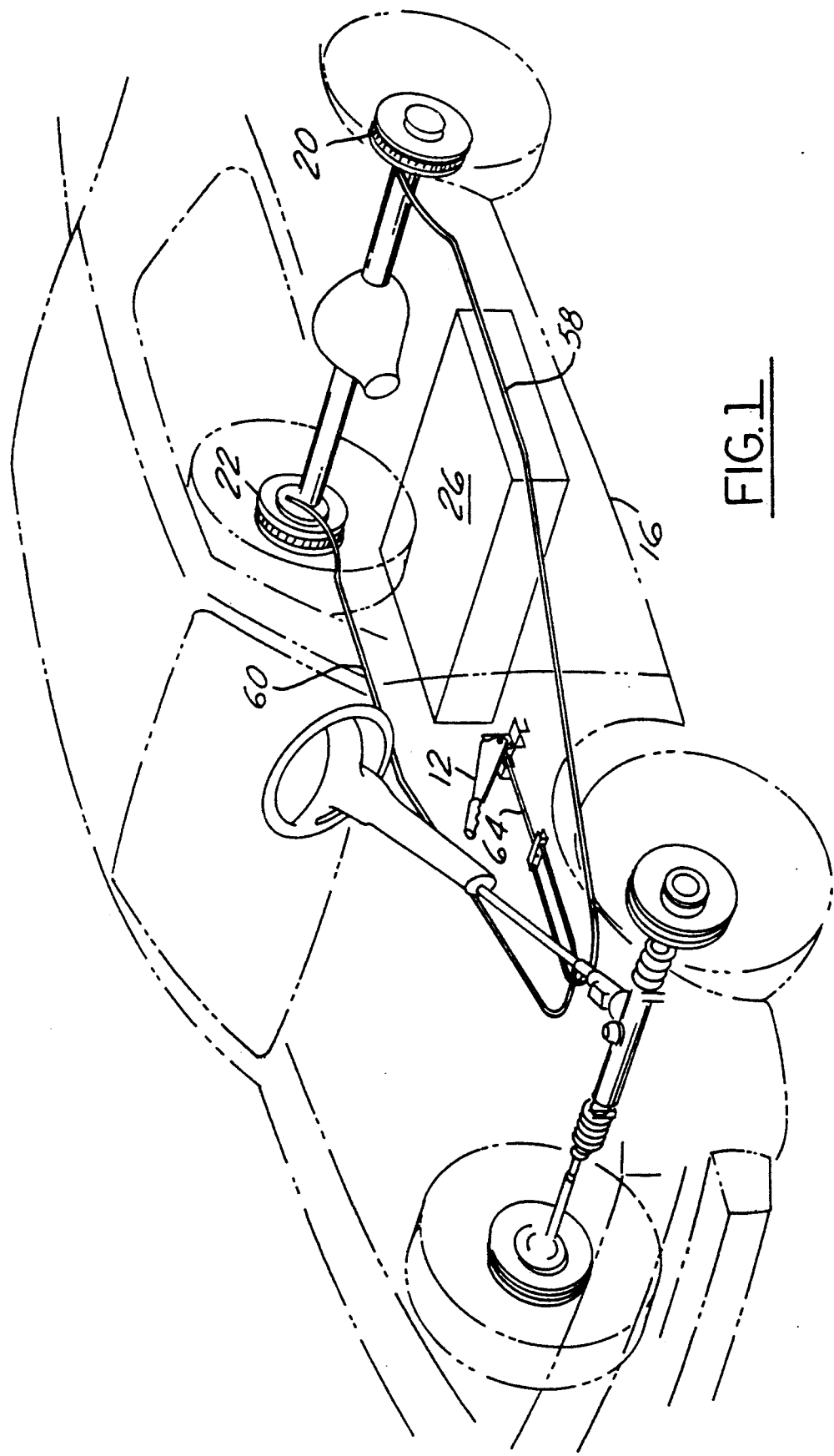
FIG. 1 is a perspective view of a motor vehicle having a parking brake apparatus according to the present invention.

Referring now to the figures, FIG. 1 illustrates a motor vehicle 10 having a parking brake apparatus according to the present invention. A hand operated brake actuator 12 is supported on a floor member 18 of the motor vehicle body structure 16. The brake actuator 12 operatively connects a left 20 and right 22 rear wheel brake by cable means 24. A battery 26 mounts to the underside of the body structure 16 between the brake actuator 12 and the left 20 and right 22 rear wheel brakes.

Figure 2:
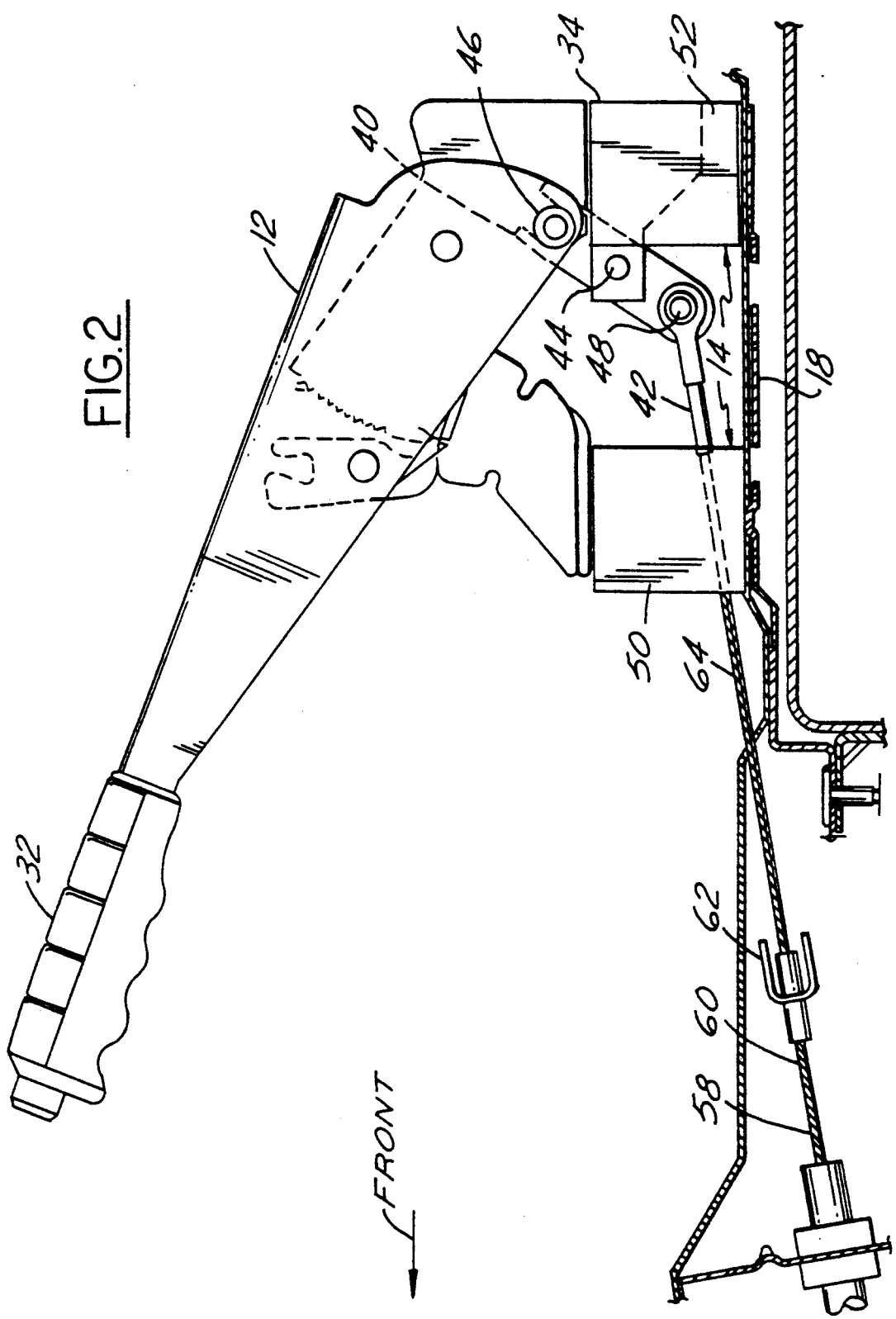
FIG. 2 is an elevational view of a parking brake apparatus according to the present invention.

FIG. 2 illustrates the parking brake apparatus of the present invention with the brake actuator 12 elevated a predetermined distance above the floor member 18 by bracket means 14. The brake actuator 12 translates an input force exerted by the operator on actuator handle 32 to an output force at camming pin 34. It should be readily apparent to one skilled in the art that many types of brake actuators exist having the same operability and utility.

Figure 3:
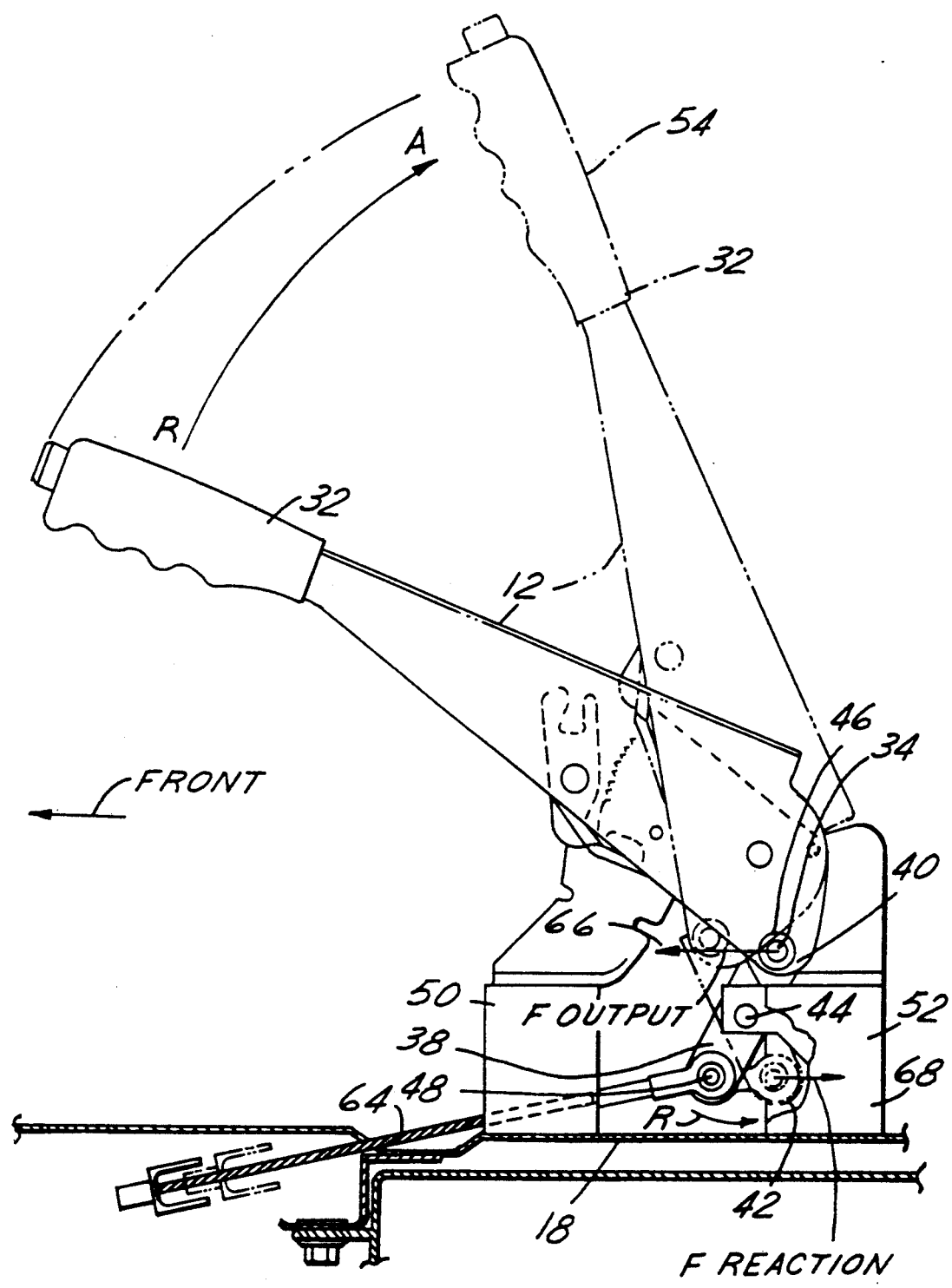
FIG. 3 is an elevational view of a parking brake apparatus in a brake-released and brake-applied position according to the present invention.

As further shown in FIGS. 2 and 3, the parking brake apparatus includes link means 36 comprising an elongate link member 38 operatively interposed and connecting the brake actuator 12 to the cable means 24. The link member 38 has an upper end 40 and a lower end 42 and attaches to the bracket means 14 with a pivotable fastener 44. The upper end 40 of link member 38 forms a camming surface 46 for engagement with the camming pin 34. The camming surface 46 comprises a U-shaped slot, however, the present invention is not so limited. Many configurations would function equivalently, such as a V-shaped slot or an oval aperture. The lower end 42 of link member 38 operates as a cable fastener 48. The cable fastener may comprise, but is not limited to, a pinned joint or a threaded rod fastener.

The bracket means 14 includes first 50 and second 52 brackets mounted to the floor member 18 to elevate and support the brake actuator 12. Additionally, the second bracket 52 includes a cantilevered, pivotable fastener 44 which engages the pivotable fastener 44 of the link member 38. The height of the bracket means 14 determines the clearance for link member 38 rotations from a brake-applied position 54 to a brake-released position 56. It should be readily apparent to those skilled in the art that various designs would serve the purposes of the bracket means stated herein. For example, the design could include, but is not limited to, having the actuator 12 mounted directly to the floor member 18.

Referring back to FIGS. 1 and 2, the cable means 24 includes first 58 and second 60 cables operatively connected to the respective left 20 and right 22 wheel brakes. The first 58 and second 60 cables extend forward (to the front of the vehicle) from the respective wheel brake along the outboard sides of the body structure 16. At a predetermined point forward of the front edge of the battery 26, the cables 58 and 60 bend laterally inboard and extend rearward to connect to an equalizer 62 at a point forward of the brake actuator 12. A third cable 64 attaches the equalizer 62 to the pivotable fastener 44 disposed on the lower end 42 link member 38.

In operation and as shown in FIG. 3, the vehicle operator engages the parking brake by raising the actuator handle 32 of the brake actuator 12 from the released position 56 to the applied position 54, which ultimately creates a predetermined tension force in the cable means. As the actuator 36 is rotated upward by the operator, the output force at the camming pin 34 acting on the camming surface 46 is directed toward the front of the motor vehicle 10. The link member 38 rotates on the pivotable fastener 44. The reaction force 68 at the lower end of the link member 42 pulls the cable means 24 toward the rear of the motor vehicle 10. The cable means 24 directly transmits the resultant tension force to the respective left 20 and right 22 wheel brakes.

The foregoing description presents one embodiment of the present invention. Details of construction have been shown and described for purposes of illustration rather than limitation. Modifications and alterations of the invention may occur to those skilled in the art. It is the following claims, including all equivalents, which define the scope of my invention.

I claim:

1. A parking brake apparatus for use in a motor vehicle, the apparatus mounted on a floor member, for connecting a hand-operated brake actuator to a right rear wheel brake and a left rear wheel brake, said parking brake apparatus comprising:
   link means for reversing and transmitting an output force from said brake actuator to a tension force at said right rear wheel brake and said left rear wheel brake;
   bracket means for mounting said brake actuator to said floor member;
   an equalizer;
   cable means operatively connecting said link means to said wheel brake wherein said cable means comprises:
      a first cable operatively interconnecting said right rear wheel brake to said equalizer;
      a second cable operatively interconnecting said left rear wheel brake to said equalizer; and
      a third cable interconnecting said equalizer to said link means.

2. A parking brake apparatus according to claim 1, wherein said link means further comprises:
   an elongate link member having an upper and a lower end;
   a camming pin operatively engaged to said brake actuator;
   a camming surface disposed on said upper end of said link member for slidably engaging said camming pin;
   a pivotable fastener for fastening said link member to said bracket means at a point disposed approximately between said upper and said lower end of said link member; and
   a cable fastener disposed on said lower end of said link member for fastening said cable means to said link member.

3. A parking brake apparatus according to claim 2, wherein said camming surface comprises an U-shaped slot.

4. A parking brake apparatus according to claim 2, wherein said link is angularly displaceable from a brake-released position to a brake-applied position.

5. A parking brake apparatus according to claim 2, wherein said bracket means further comprises:
   a first bracket operatively associated with a second bracket, said first and second brackets being adapted to raise said brake actuator a predetermined distance above said floor member to allow clearance for said link member to rotate.

6. A parking brake apparatus according to claim 5, wherein said second bracket further comprises a cantilever for supporting said pivotable fastener thereby allowing said link member to pivot relative to said second bracket.

7. A parking brake apparatus according to claim 1, wherein said cable means extends forward from said wheel brakes along respective outboard edges of said vehicle to a predetermined location, thereupon bending laterally inboard and extending rearward to connect to said link member.

8. A parking brake apparatus for use in a motor vehicle, the apparatus mounted on a floor member, to operatively connect a hand-operated brake actuator to a right rear wheel brake and a left rear wheel brake, said parking brake apparatus comprising:
   a camming pin operativelely engaged to said brake actuator;
   bracket means for mounting said brake actuator to said floor member;
   an elongate link member having an upper end and a lower end for reversing and transmitting an output force from said brake actuator to a tension force at said right rear wheel brake and said left rear wheel brake, said link member further comprising:
      a camming surface disposed on said upper end of said link member for slidably engaging said camming pin;
      A pivotable fastener for fastening said link member to said bracket means at a point disposed approximately between said upper and said lower end of said link member;
      a cable fastener disposed on said lower end of said link member for fastening said cable means to said link member;
   an equalizer;
   a first cable operatively interconnecting said right rear wheel brake extending forward from said right rear wheel brake along an outboard edge of said vehicle to a predetermined location, thereupon bending laterally inboard and extending rearward to connect to said equalizer;
   a second cable operatively interconnecting said left rear wheel brake extending forward from said left rear wheel brake along an outboard edge of said vehicle to a predetermined location, thereupon bending laterally inboard and extending rearward to connect to said equalizer; and
   a third cable interconnecting said equalizer to said link means.

9. A parking brake apparatus according to claim 8, wherein said link is angularly displaceable from a brake released position to a brake-applied position.

10. A parking brake apparatus according to claim 8, wherein said bracket means further comprises:
   a first bracket operatively associated with a second bracket, said first and second brackets being adapted to raise said brake actuator a predetermined distance above said floor member to allow clearance for said link member to rotate.

11. A parking brake apparatus according to claim 10, wherein said bracket means further comprises a cantilever for supporting said pivotable fastener thereby allowing said link member to pivot relative to said bracket means.

12. A parking brake apparatus for use in a motor vehicle, mounted on a floor member to operatively connect a hand-operated brake actuator to a right rear wheel brake and a left rear wheel brake, said parking brake apparatus comprising:
- a camming pin operatively engaged to said brake actuator;
- a first bracket;
- a second bracket, together with said first bracket, adapted to raise said brake actuator a predetermined distance above said floor member to allow clearance for said link member rotation;
- an elongate link member having an upper end and a lower end for reversing and transmitting an output force from said brake actuator to a tension force at said right rear wheel brake and said left rear wheel brake, said link member further comprising:
- a camming surface disposed on said upper end of said link member for slidably engaging said camming pin;
- a pivotable fastener for fastening said link member to a cantilever on said second bracket at a point disposed approximately between said upper and said lower end of said link member such that said link member is angularly displaceable from a brake-released position to a brake-applied position;
- a cable fastener disposed on said lower end of said link member for fastening said cable means to said link member;
- an equalizer;
- a first and second cable each operatively connected, respectively to said right rear wheel brake and said left rear wheel brake, each of said cables extending forward from said brakes along respective outboard edges of said vehicle to a predetermined location, thereupon bending laterally inboard and extending rearward to connect to said equalizer; and
- a third cable connecting said equalizer to said link member.

* * * * *